(12) United States Patent
Nishikawa

(10) Patent No.: US 8,594,580 B2
(45) Date of Patent: Nov. 26, 2013

(54) DATA COMMUNICATION APPARATUS, COMMUNICATION METHOD, AND PROGRAM

(75) Inventor: Koji Nishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1160 days.

(21) Appl. No.: 12/445,480

(22) PCT Filed: Dec. 11, 2006

(86) PCT No.: PCT/JP2006/324652
§ 371 (c)(1),
(2), (4) Date: Apr. 14, 2009

(87) PCT Pub. No.: WO2008/072301
PCT Pub. Date: Jun. 19, 2008

(65) Prior Publication Data
US 2010/0085161 A1    Apr. 8, 2010

(51) Int. Cl.
*H04B 1/00* (2006.01)
(52) U.S. Cl.
USPC ............ 455/63.3; 455/62; 455/127; 340/10.3
(58) Field of Classification Search
USPC .......................... 455/62, 63.3, 127; 340/10.3
See application file for complete search history.

(56) References Cited

U.S. PATENT DOCUMENTS

| | | | |
|---|---|---|---|
| 5,375,140 A * | 12/1994 | Bustamante et al. | 375/142 |
| 5,883,582 A | 3/1999 | Bowers et al. | |
| 2002/0072340 A1 * | 6/2002 | Hutchison et al. | 455/127 |

FOREIGN PATENT DOCUMENTS

| | | |
|---|---|---|
| JP | 7 251739 | 10/1995 |
| JP | 8 123919 | 5/1996 |
| JP | 11 102419 | 4/1999 |
| JP | 2000 242742 | 9/2000 |
| JP | 2003 283367 | 10/2003 |
| JP | 2006 60310 | 3/2006 |
| JP | 2006 86911 | 3/2006 |
| JP | 2006 197231 | 7/2006 |
| JP | 2006 197233 | 7/2006 |
| TW | 399190 | 7/2000 |

* cited by examiner

*Primary Examiner* — Edward Urban
*Assistant Examiner* — Hsin-Chun Liao
(74) *Attorney, Agent, or Firm* — Oblon, Spivak, McClelland, Maier & Neustadt, L.L.P.

(57) ABSTRACT

In a data reading apparatus performing contactless data communications with IC tags, a multi channel setting section sets a plurality of frequencies to be used for data communication with an IC tag in advance; a multi channel interference detecting section detects radio interference from other data reader in each of the set plurality of frequencies, prior to occurrence of a data communication request with an IC tag; a carrier sense lapse time holding section holds a period of no interference based on an interference detection result from the multi channel interference detecting section; a time comparing section determines whether the carrier sense lapse time held by the carrier sense lapse time holding section is on or above a predetermined carrier sense time upon occurrence of the data communication request with the IC tag, and permits the data communication with the IC tag when the carrier sense lapse time is on or above the carrier sense time; a transmitting section transmits data to the IC tag; and hence wait time for interference detection may be reduced.

6 Claims, 6 Drawing Sheets

DATA COMMUNICATION APPARATUS, COMMUNICATION METHOD, AND PROGRAM

TECHNICAL FIELD

The present invention relates to a data communication apparatus that is configured to perform wireless data communications, and the like. More specifically, the present invention relates to a data reading apparatus that is configured to perform contactless data communications with Integrated Circuit (IC) tags, and the like.

BACKGROUND ART

Radio Frequency Identification (RFID), or automatic recognition by contactless data communication, has been used for individual management of goods and articles or entrance/exit management.

According to the automatic recognition by contactless data communication, an IC tag with a unique ID written thereon is attached to an identifying object (an article or a person). Then, a data reader placed at the gate or on the door side supplies electricity to the IC tag by radio waves, and also transmits commands to read the unique ID.

With the IC tag, a silicon chip built therein is driven by the radio waves from the data reader. In response to the commands from the data reader, the IC tag responds by providing information stored in the IC tag, such as the unique ID, with presence or absence of reflection of unmodulated radio waves emitted from the data reader.

The data reader then identifies the presence of the reflected waves as the response from the IC tag, and reads the information stored in the IC tag such as the unique ID.

Now, two or more data readers may be placed in the same neighborhood. In this case, carrier sensing function is used to avoid radio interference among data readers. In order to prevent interference of radio waves emitted from other data readers around, one data reader uses the carrier sensing function with which the one data reader emits radio waves after confirming that no other data reader is emitting its radio waves in the frequency (channel) the one data reader intends to use for emitting radio waves, or that radio interference at the intended frequency (channel) to be used for radio emission is on or below a predetermined threshold.

Therefore, each data reader waits for a certain period of time prior to the start of a data communication with an IC tag, to confirm that no other data reader is emitting radio waves in the intended frequency (channel) to be used for radio emission, or that radio interference in the intended frequency (channel) to be used for radio emission is on or below a predetermined threshold.

Each data reader also waits for a certain period of time, when another data reader is emitting radio waves in the intended frequency (channel) to be used for radio emission, to confirm that the other data reader is not emitting radio waves (the radio emission is finished), or that radio interference in the intended frequency is on or below a predetermined threshold.

Patent Document 1: JP 2000-242742 A

DISCLOSURE OF THE INVENTION

Problems to be Solved by the Invention

However, in the case of reading IC tags attached to moving goods or objects along conveyer belts, for example, some IC tags may not be identified if they passed the communication enable area of a data reader when the data reader is in a wait state because of another data reader emitting radio waves.

Thus, there is a problem in identifying moving IC tags. Moving IC tags may be left overlooked while the data reader is in a wait state.

The present invention is directed mainly to solve problems such as that described above. A main object of the present invention is to reduce the wait time of a data reading apparatus so that IC tags are prevented from being overlooked, by detecting radio interference in a plurality of available frequencies (channels) and selecting a frequency (channel) without radio interference.

Means to Solve the Problems

A data communication apparatus according to the present invention may perform a wireless data communication with a communication destination device. The data communication apparatus may include:

an interference monitoring section that may monitor radio interference in a usage scheduled frequency to be used for the wireless data communication with the communication destination device, prior to receipt of a request to start the wireless data communication with the communication destination device;

a time comparing section that may compare a duration of no interference, during which the interference monitoring section detects no radio interference in the usage scheduled frequency, with a threshold corresponding to the duration of no interference, upon receipt of the request to start the wireless data communication with the communication destination device, and permit the wireless data communication in the usage scheduled frequency when the duration of no interference exceeds the threshold; and a communicating section that may perform the wireless data communication with the communication destination device in the usage scheduled frequency based on a permission issued by the time comparing section.

The time comparing section may permit the wireless data communication in the usage scheduled frequency when the duration of no interference is less than the threshold at a time of receipt of the request to start the wireless data communication with the communication destination device, but the duration of no interference exceeds the threshold, as a result of no radio interference detected in the usage scheduled frequency by the interference monitoring section even after receipt of the request to start the wireless data communication with the communication destination device.

The data communication apparatus may further include a usage scheduled frequency setting section that may set a plurality of frequencies as usage scheduled frequencies, and also set an order of monitoring radio interference by the interference monitoring section in the plurality of usage scheduled frequencies. The interference monitoring section may monitor radio interference in one of the plurality of usage scheduled frequencies according to the order of monitoring set by the usage scheduled frequency to setting section, and monitor radio interference in a next usage scheduled frequency in the order of monitoring when radio interference is detected in the one of the plurality of usage scheduled frequencies being monitored.

A data communication apparatus according to the present invention may perform a wireless data communication with a communication destination device. The data communication apparatus may include:

a usage scheduled frequency setting section that may set a plurality of frequencies as usage scheduled frequencies to be used for the wireless data communication with the communication destination device;

an interference monitoring section that may monitor radio interference in the plurality of usage scheduled frequencies set by the usage scheduled frequency setting section in parallel;

a time comparing section that may compare a duration of no interference, during which the interference monitoring section detects no radio interference, with a threshold corresponding to the duration of no interference in the plurality of usage scheduled frequencies, and permit the wireless data communication in one of the plurality of usage scheduled frequencies in which the duration of no interference exceeds the threshold; and a communicating section that may perform the wireless data communication with the communication destination device in the one of the plurality of usage scheduled frequencies permitted for the wireless data communication by the time comparing section.

The time comparing section may permit the wireless data communication in a usage scheduled frequency in which the duration of no interference exceeds the threshold the fastest among the plurality of usage scheduled frequencies.

The data communication apparatus may further include an interference level holding section that may hold a radio interference level of each usage scheduled frequency detected by the interference monitoring section when monitoring a radio interference situation in the plurality of usage scheduled frequencies. The time comparing section may permit the wireless data communication in a usage scheduled frequency in which the duration of no interference exceeds the threshold, and the radio interference level held by the interference level holding section is the lowest among the plurality of usage scheduled frequencies.

The interference monitoring section may monitor a radio interference situation in the plurality of usage scheduled frequencies in parallel on a time sharing basis.

The data communication apparatus may be a data reading apparatus that is configured to communicate with a contactless IC tag as the communication destination device.

A communication method according to the present invention may be performed by a data communication apparatus for a wireless data communication with a communication destination device. The communication method may include:

monitoring, by the data communication apparatus, radio interference in a usage scheduled frequency to be used for the wireless data communication with the communication destination device, prior to receipt of a request to start the wireless data communication with the communication destination device;

comparing, by the data communication apparatus, a duration of no interference, during which no radio interference is detected in the usage scheduled frequency, with a threshold corresponding to the duration of no interference, upon receipt of the request to start the wireless data communication with the communication destination device; and performing, by the data communication apparatus, the wireless data communication with the communication destination device in the usage scheduled frequency, when the duration of no interference exceeds the threshold.

A communication method according to the present invention may be performed by a data communication apparatus for a wireless data communication with a communication destination device. The communication method may include:

setting, by the data communication apparatus, a plurality of frequencies as usage scheduled frequencies to be used for the wireless data communication with the communication destination device;

monitoring, by the data communication apparatus, radio interference in the set plurality of usage scheduled frequencies in parallel;

comparing, by the data communication apparatus, a duration of no interference, during which no radio interference is detected, with a threshold corresponding to the duration of no interference in the plurality of usage scheduled frequencies; and performing, by the data communication apparatus, the wireless data communication with the communication destination device in one of the plurality of usage scheduled frequencies in which the duration of no interference exceeds the threshold.

A program according to the present invention may cause a computer performing a wireless data communication with a communication destination device, to execute:

an interference monitoring process, for monitoring radio interference in a usage scheduled frequency to be used for the wireless data communication with the communication destination device, prior to receipt of a request to start the wireless data communication with the communication destination device;

a time comparing process, for comparing a duration of no interference, during which no radio interference is detected in the usage scheduled frequency in the interference monitoring process, with a threshold corresponding to the duration of no interference, upon receipt of the request to start the wireless data communication with the communication destination device, and for permitting the wireless data communication in the usage scheduled frequency, when the duration of no interference exceeds the sa communicating process, for performing the wireless data communication with the communication destination device in the usage scheduled frequency based on a permission issued in the time comparing process.

A program according to the present invention may cause a computer performing a wireless data communication with a communication destination device, to execute:

a usage scheduled frequency setting process, for setting a plurality of frequencies as usage scheduled frequencies to be used for the wireless data communication with the communication destination device;

an interference monitoring process, for monitoring radio interference in the plurality of usage scheduled frequencies set in the usage scheduled frequency setting process in parallel;

a time comparing process, for comparing a duration of no interference, during which no radio interference is detected in the interference monitoring process, with a threshold corresponding to the duration of no interference in the plurality of usage scheduled frequencies, and for permitting the wireless data communication in one of the plurality of usage scheduled frequencies in which the duration of no interference exceeds the threshold; and a communicating process, for performing the wireless data communication with the communication destination device in one of the plurality of usage scheduled frequencies permitted for the wireless data communication in the time comparing process.

Effect of the Invention

According to the present invention, radio interference in a usage scheduled frequency has already been monitored prior to receipt of a request to start a wireless data communication with a communication destination device. This may allow for a reduction in response time to the request to start the wireless data communication.

BEST MODE FOR CARRYING OUT THE INVENTION

Embodiment 1

FIG. 1 illustrates an example configuration of a data reading apparatus according to a first embodiment. FIG. 2 illustrates an example of a processing procedure (a communication method) of the data reading apparatus. FIG. 3 illustrates an example of a timing chart showing an operation of radio interference detection in an IC tag reading process.

As shown in FIG. 1, the data reading apparatus 1 (a data communication apparatus) is connected to a control terminal 2, and performs a wireless data communication with a contactless IC tag 4 (a communication destination device).

The control terminal 2 may issue a request to read the IC tag 4 to the data reading apparatus 1, and perform various types of processing according to the ID of the read IC tag.

In the data reading apparatus 1, a multi channel setting section 11 may set a plurality of channels available for a wireless communication with the IC tag 4.

A multi channel interference detecting section 12 may detect radio interference in a channel specified by the multi channel setting section 11.

A carrier sense lapse time holding section 13 may receive a detection result of radio interference from the multi channel interference detecting section 12 and channel information on a channel where the radio interference detection is being conducted, and measure time in which no radio interference occurred.

A carrier sense time setting section 14 may set time for carrier sensing.

A time comparing section 15 may compare carrier sense time set by the carrier sense time setting section 14 and carrier sense lapse time measured by the carrier sense lapse time holding section 13. The time comparing section 15 may then issue the channel information and a radio emission permission to permit the use of the channel indicated by the channel information for communication, when the carrier sense lapse time exceeds the carrier sense time.

A control section 30 may set a plurality of available channels in the multi channel setting section 11, set the carrier sense time in the carrier sense time setting section 14, set transmission data to the IC tag, and then store data received from the IC tag.

A transmitting section 40 may transmit the transmission data set by the control section 30 by emitting radio waves, upon receipt of the channel information and the radio emission permission from the time comparing section 15.

A receiving section 50 may receive a response from the IC tag.

A transmitting antenna 3a and a receiving antenna 3b may be used for communicating with the IC tag 4.

The separate antennas, the transmitting antenna 3a and the receiving antenna 3b, of FIG. 1 may alternatively be combined into a transmitting/receiving antenna.

The function of the control terminal 2 may be incorporated into that the function of the control section 30 so that the data reading apparatus is configured without the control terminal 2.

It should be noted that the multi channel setting section 11 of this embodiment may set a plurality of frequencies as usage scheduled frequencies to be used for a wireless data communication with an IC tag (referred to also as usage scheduled frequencies). The multi channel setting section 11 may also set a monitoring order of radio interference in the plurality of usage scheduled frequencies in the multi channel interference detecting section 12. The multi channel setting section 11 is an example of a usage scheduled frequency setting section.

The multi channel interference detecting section 12 may monitor radio interference in a frequency to be used for a wireless data communication with the IC tag specified by the multi channel setting section 11 (referred to also as a usage scheduled frequency) prior to receipt of the request to read the IC tag 4 (a request to start the wireless data communication with the IC tag 4) from the control terminal 2. According to this embodiment, when monitoring radio interference, the multi channel interference detecting section 12 may monitor radio interference in one of the plurality of usage scheduled frequencies according to the monitoring order set by the multi channel setting section 11, if radio interference is detected in the usage scheduled frequency monitored, the multi channel interference detecting section 12 then monitors radio interference in the next usage scheduled frequency in the monitoring order. The multi channel interference detecting section 12 is an example of an interference monitoring section.

The time comparing section 15 may compare the carrier sense lapse time (a duration of no interference) and the carrier sense time, upon receipt of a request to read the IC tag 4 (the request to start a wireless data communication with the IC tag 4) from the control terminal 2. The carrier sense lapse time may be defined as a period of time in which the multi channel interference detecting section 12 detects no radio interference in a usage scheduled frequency. The carrier sense time may be defined as a threshold corresponding to the carrier sense lapse time. The time comparing section 15 may permits the wireless data communication with the IC tag 4 in the usage scheduled frequency when the carrier sense lapse time exceeds the carrier sense time.

The time comparing section 15 may also permit the wireless data communication with the IC tag 4 in the usage scheduled frequency, when the carrier sense lapse time is less than the carrier sense time upon receipt of the request to read the IC tag 4 from the communication terminal 2, however, the carrier sense lapse time exceeds the carrier sense time as a result of no radio interference detected in the usage scheduled frequency by the multi channel interference detecting section 12 even after receipt of the request to read the IC tag 4.

The transmitting section 40 performs the wireless data communication with the IC tag 4 in the usage scheduled frequency based on a permission from the time comparing section 15. The transmitting section 40 is an example of a communicating section.

An example hardware configuration applicable to the data reading apparatus 1 of this embodiment and that of another embodiment described hereinafter is now described.

FIG. 6 illustrates an example of a hardware resource applicable to the data reading apparatus 1 of this embodiment and that of another embodiment described hereinafter. FIG. 6 illustrates only an example of the hardware configuration of the data reading apparatus 1. It should be noted therefore that the hardware configuration of the data reading apparatus 1 is not limited to the configuration illustrated in FIG. 6. The data reading apparatus 1 may thus employ an alternative hardware configuration.

Referring to FIG. 6, the data reading apparatus 1 may include a CPU 911 (referred to also as a Central Processing Unit, a processing unit, an arithmetic operation unit, a microprocessor, a microcomputer, or a processor) to execute programs. The CPU 911 may be connected via a bus 912 to a Read Only Memory (ROM) 913, a Random Access Memory (RAM) 914, a communication board 915 and a magnetic disk drive 920, for example, and control those hardware devices. The CPU 911 may be connected also to a display unit 901, a keyboard 902, a mouse 903, a Flexible Disk Drive (FDD) 904, a Compact Disk Drive (CDD) 905, a printer unit 906, and a scanner unit 907. The magnetic disk drive 920 may be replaced by a storage unit such as an optical disk drive or a memory card reader/writer.

The RAM 914 is an example of a volatile memory. Storage media such as the ROM 913, the FDD 904, the CDD 905, and the magnetic disk drive 920 are examples of nonvolatile memories. Those are examples of storage units or storing sections.

The communication board 915, the keyboard 902, the scanner unit 907, the FDD 904, etc. are examples of input units or input sections.

The communication board 915, the display unit 901, the printer unit 906, etc. are examples of output units or output sections.

The communication board 915 may also be used for data communications over a Local Area Network (LAN), the Internet, a Wide Area Network (WAN), or the like, other than the wireless data communications with the IC tags 4.

The magnetic disk drive 920 may store an Operating System (OS) 921, a window system 922, a program group 923, and a file group 924. The programs of the program group 923 may be executed by the CPU 911, the operating system 921, and the window system 922.

The program group 923 may store programs for executing functions described as "sections" and "means" in the descriptions of this and another embodiments described hereinafter. The programs may be read by the CPU 911 to be executed.

The file group 924 may store information, data, signal values, variable values and parameters indicating the results of processes described as "determination", "computation", "comparison", "monitoring", "detection", "setting", etc. in the following descriptions, in the form of "file" items or "database" items. A "file" or "database" may be stored in a storage medium such as a disk or a memory. The information, data, signal values, variable values and parameters stored in storage media such as disks or memories may be read out to a main memory or a cash memory by the CPU 911 via a read/write circuit, and used in CPU operations for extraction, retrieval, reference, comparison, arithmetic operations, computation, processing, editing, outputting, printing, displaying, and the like. During a CPU operation for extraction, retrieval, reference, comparison, arithmetic operations, computation, processing, editing, outputting, printing, or displaying, the information, data, signal values, variable values or parameters may be temporarily stored in a main memory, a register, a cash memory, a buffer memory, or the like.

Arrows illustrated in the flow chart descried hereinafter mainly indicate inputs/outputs of data or signals. The data and signal values may be stored in the memory of the RAM 914, the flexible disk of the FDD 904, the compact disk of the CDD 905, the magnetic disk of the magnetic disk drive 920, or other storage media such as an optical disk, a mini disk, a DVD. The data and signals may be transmitted online by way of the bus 912, a signal line, a cable, or any other transmission medium.

What is described as a "section" or "means" in the descriptions of this and another embodiments described hereinafter may alternatively be a "circuit", a "device", "equipment", or a "function". Or otherwise, the "section" or "means" may alternatively be a "step", a "procedure", or a "process". In other words, what is described as the "section" or "means" may be implemented by firmware stored in the ROM 913; software alone; hardware alone, such as an element, a device, a substrate, a wire; a combination of software and hardware; or a combination of software, hardware and firmware. Firmware and software may be stored as programs in a storage medium, such as a magnetic disk, a flexible disk, an optical disk, a compact disk, a mini disk, a DVD. A program may be read out and executed by the CPU 911. More specifically, a program may cause a computer to function as a "section" or "means" in this and another embodiments described hereinafter. A program may alternatively cause a computer to execute the procedure or method performed by a "section" or "means" in this and another embodiments described hereinafter.

Thus, the data reading apparatus 1 of this embodiment and that of another embodiment described hereinafter each may be a computer equipped with a processor such as a CPU, a storage unit such as a memory, a magnetic disk or the like, an input unit such as a keyboard, a mouse, a communication board or the like, and an output unit such as a display unit, a communication board or the like, etc. As described earlier, the data reading apparatus 1 of this embodiment and that of another embodiment may be configured to implement a function described as a "section" or "means" by using those processing units, storage units, input units, and output units, etc.

An operation is now described briefly with reference to FIG. 1 and FIG. 2.

The data reading apparatus 1 sets, in the multi channel setting section 11, one or more available channels (usage scheduled frequencies) that have been set in the control section 30 at the startup (Step 1 of FIG. 2).

Then, the control section 30 generates a predetermined period of time (e.g., a random time) as the carrier sense time, and sets the predetermined period of time in the carrier sense time setting section 14 (Step 2 of FIG. 2). The control section 30 then clears the carrier sense lapse time currently held by the carrier sense lapse time holding section 13 (Step 3 of FIG. 2).

After the carrier sense lapse time is cleared from the carrier sense lapse time holding section, the multi channel interference detecting section 12 starts monitoring radio interference.

The multi channel interference detecting section 12 monitors radio interference in the first channel set by the multi channel setting section 11 at the beginning. When the radio interference is on or below a predetermined threshold, the multi channel interference detecting section 12 determines that carrier sensing is OK. Then, the carrier sense lapse time holding section 13 measures time during which radio interference is on or below the threshold.

When the multi channel interference detecting section 2 detects radio interference, and the detected radio interference is on or above the threshold, then the multi channel interference detecting section 12 tries to detect radio interference in the next channel set by the multi channel setting section 11, after the carrier sense lapse time holding section 13 clears the currently holding carrier sense lapse time.

The process of radio interference detection performed by the data reading apparatus 1 described hereinabove may be performed in parallel with a communicating operation performed between the control section 30 and a control terminal 2 described hereinafter.

The control section 30 determines whether a request to stop carrier sensing is received from the control terminal 2 (Step 4 of FIG. 2).

When the stop request is received from the control terminal 2 ("Yes" in Step 4 of FIG. 2), the control section 30 performs a stop process (Step 11 of FIG. 2) and terminates the process.

If the stop request has not been received from the control terminal 2 ("No" in Step 4 of FIG. 2), then the control section 30 determines whether a request to read the IC tag 4 is received from the control terminal 2 (Step 5 of FIG. 2).

If the read request has not been received from the control terminal 2 ("No" in Step 5 of FIG. 2), then the control section 30 repeats the process of determining whether the stop request is received from the control terminal 2 (Step 4 of FIG. 2).

When the read request is received from the control terminal 2 ("Yes" in Step 5 of FIG. 2), the time comparing section 15, instructed by the control section 30, determines whether the carrier sense lapse time exceeds the previously set carrier sense time (the carrier sense time set in Step 2 of FIG. 2) in the previously set channel to be used (the channel set in Step 1 of FIG. 2) (Step 6 of FIG. 2).

When the carrier sense lapse time has not yet exceeded the previously set carrier sense time (Step 2 of FIG. 2) ("No" in Step 6 of FIG. 2), then the time comparing section 15 waits until the carrier sense lapse time exceeds the previously set carrier sense time (Step 2 of FIG. 2).

When the carrier sense lapse time exceeds the previously set carrier sense time (Step 2 of FIG. 2) ("Yes" in Step 6 of FIG. 2), the time comparing section 15 then instructs the transmitting section 40 to emit radio waves in a channel where radio interference is on or below the predetermined threshold. The transmitting section 40 starts emitting radio waves in the channel specified by the time comparing section 15, and transmits a command (Step 7 of FIG. 2).

When the command transmission is completed (Step 7 of FIG. 2), the receiving section 50 then tries to receive a response from the IC tag 4 (Step 8 of FIG. 2).

When the response is received from the IC tag (Step 8 of FIG. 2), the control section 30 then determines whether a read operation from the IC tag 4 is completed (Step 9 of FIG. 2). When the read operation is completed ("Yes" in Step 9 of FIG. 2), the control section 30 then reports a read result to the control terminal 2 (Step 10 of FIG. 2). The control section 30 then sets one or more available channels in the multi channel setting section 11 (Step 1 of FIG. 2) for the next communication, and repeats the process described above.

If the read operation is not completed ("No" in Step 9 of FIG. 2), then the transmitting section 40 transmits the command again (Step 7 of FIG. 2) and the receiving section 50 receives the response again (Step 8 of FIG. 2).

In the description above, a channel is set every time for use (Step 1 of FIG. 2). In the case where a channel set at the time of startup is continued to be used, however, the operation may be proceed to the process of setting the carrier sense time (Step 2 of FIG. 2) after reporting the read result to the control terminal 2 (Step 10 of FIG. 2).

Also in the case where the carrier sense time set at the startup is continued to be used, then the process of setting the carrier sense time (Step 2 of FIG. 2) may be skipped over to the next process of clearing the carrier sense lapse time (Step 3 of FIG. 2).

Conventional data readers are designed to monitor radio interference in a usage scheduled frequency after receipt of a request to read an IC tag, and therefore communicate with an IC tag after a lapse of the carrier sense time from receipt of the request to read the IC tag. According to this embodiment, however, radio interference has been monitored before the occurrence of a request to read an IC tag. This may thus allow for a sooner communication with an IC tag after the occurrence of a request to read the IC tag.

An operation of determining the carrier sense time is now described in detail with reference to FIG. 3.

First, the control section 30 sets available channels in the multi channel setting section 11.

In the example of this figure, CH1, CH2 and CH3 are set as available channels. The frequencies of CH1, CH2 and CH3 differ from one another.

Then, the carrier sense time is set, and the carrier sense lapse time is cleared (not shown in the figure).

Next, when the carrier sense time is cleared, the multi channel interference detecting section 12 starts conducting radio interference detection in CH1, first.

In CH1, no radio interference has been detected for a while since the start of detection. After a while, however, radio interference from other data reader is detected. Then, the multi channel interference detecting section 12 stops conducting radio interference detection in CH1 there, and clears the carrier sense lapse time (not shown in the figure).

The multi channel interference detecting section 12 then starts conducting radio interference detection in CH2, the next set channel.

In CH2, no radio interference has been detected for a while since the detection started. After a while, however, radio interference from other data reader is detected. Then, the multi channel interference detecting section 12 stops conducting radio interference detection in CH2 there, and clears the carrier sense lapse time (not shown in the figure).

The multi channel interference detecting section 12 then starts conducting radio interference detection in CH3, the next set channel. In CH3, no radio interference is detected. Then, the control section 30 receives a read request from the control terminal 2 when the carrier sense lapse time exceeds the previously set carrier sense time.

The control section 30 upon receipt of the read request instructs the time comparing section 15 to compare the carrier sense lapse time and the carrier sense time.

The time comparing section 15 confirms that the carrier sense lapse time exceeds the carrier sense time, and then issues a radio emission permission to permit the transmitting section 40 to use CH3 for communication.

Then, the transmitting section 40 starts a communication in CH3 permitted to use by the radio emission permission issued by the time comparing section 15.

The multi channel interference detecting section 12 stops radio interference detection upon start of transmission by the transmitting section 40.

When the transmitting section 40 completes the command transmission and the receiving section 50 completes the response reception, then the communication is completed. The transmitting section 40 then stops emitting radio waves.

When the communication is completed, the control section 30 reports a result to the control terminal 2.

The control section 30, after reporting the result to the control terminal 2, sets available channels and the carrier sense time again for the next communication.

In the example of this figure, CH2 and CH3 are set as available channels.

Then, after the carrier sense lapse time is cleared, the multi channel interference detecting section 12 starts detecting radio interference in CH2, first.

As described earlier, radio interference may be detected in advance in previously set one or more available channels. This may allow for a reduction in response time to a read request from a control terminal.

The data reading apparatus thus performing contactless data communications with IC tags is explained in this embodiment, and the data reading apparatus may also be configured to include:
(a) a frequency setting means setting a frequency to be used in advance;
(b) an interference detecting means detecting radio interference from other data reader in the frequency set in the frequency setting means;
(c) a carrier sense time setting means setting time for carrier sensing;
(d) a carrier sense lapse time holding means holding a period of time of no interference based on interference detection results from the interference detecting means; and
(e) a time comparing means permitting transmission when the carrier sense lapse time held by the carrier sense lapse time holding means is on or above the carrier sense time held by the carrier sense time setting means.

The data reading apparatus may be configured to operate as follows:
A frequency to be used and the carrier sense time may be set in advance. When a request for a contactless data communication with an IC tag is received, then transmission may be started upon receipt of the transmission permission from the time comparing means. When the contactless data communication is completed, a frequency to be used and the carrier sense time may be set again for the next contactless data communication.

The data reading apparatus thus performing contactless data communications with IC tags is explained in this embodiment, and the data reading apparatus may also be configured to include:
(a) a multi frequency setting means setting a plurality of frequencies available; and
(b) a multi frequency interference detecting means detecting radio interference from other data reader in a frequency set by the frequency means, and then detects radio interference in the next set frequency when the radio interference is on or above a predetermined threshold.

The data reading apparatus may be configured to operate as follows:
The plurality of available frequencies and the carrier sense time may be set in advance. If a request for a contactless data communication with an IC tag occurs, transmission may be started upon receipt of a transmission permission from the time comparing means. When the contactless data communication is completed, available frequencies and the carrier sense time may be set for the next contactless data communication.

The data reading apparatus thus performing contactless data communications with IC tags is explained in this embodiment, and the data reading apparatus may also be configured to include:
(a) a multi frequency setting means setting a plurality of frequencies available in advance;
(b) a frequency based interference detecting means detecting radio interference from other data reader in a frequency set by the multi frequency setting means;
(c) a carrier sense time setting means setting time for carrier sensing;
(d) a frequency based carrier sense lapse time holding means holding a period of time of no interference based on an interference detection result from the frequency based interference detecting means; and
(e) a time comparing means permitting transmission when the frequency based carrier sense lapse time held by the frequency based carrier sense lapse time holding means is on or above the carrier sense time held by the carrier sense time setting means.

The data reading apparatus may be configured to operate as follows:
Transmission may be performed in a frequency in which the frequency based carrier sense lapse time held by the frequency based carrier sense lapse time holding means becomes on or above the carries sense time held by the carrier sense time setting means in the shortest time.

Embodiment 2

FIG. 4 illustrates an example configuration of a data reading apparatus according to a second embodiment. FIG. 5 illustrates a timing chart showing an operation of detecting radio interference in an IC tag read process. FIG. 2 is used here as an example of an operation procedure performed in the data reading apparatus.

As shown in FIG. 4, the data reading apparatus 1 (a data communication apparatus) may be connected to the control terminal 2, and perform a wireless data communication with the IC tag 4 (a communication destination device).

The control terminal 2 may issue a request to read the IC tag 4 to the data reading apparatus 1, and perform various processes according to the ID of the read IC tag.

In the data reading apparatus 1, the multi channel setting section 11 may set a plurality of channels available.

A plurality of channel based interference level detecting sections 21a to 21n may detect a radio interference level in a channel specified by the multi channel setting section 11.

A plurality of channel based carrier sense lapse time holding sections 22a to 22n may receive a radio interference result from a corresponding one of the plurality of channel based level detecting sections 21a to 21n, and measure a period of time of no radio interference occurred.

A plurality of channel based interference level holding section 23a to 23n may receive the radio interference level detected by a corresponding one of the plurality of channel based interference level detecting sections 21a to 21n, and hold the interference level of a corresponding channel.

The carrier sense time setting section 14 may set time for carrier sensing.

A time/level comparing section 24 may issue a radio emission permission in a channel where the channel based carrier sense lapse time held by each of the channel based carrier sense lapse time holding sections, 22a to 22n, is the same or longer than the carrier sense time held by the carrier sense time setting section 14, and where the interference level is the lowest of all the interference levels held by the channel based interference level holding sections 23a to 23n.

The control section 30 may set a plurality of channels available in the plurality of channel setting sections 11, set the carrier sense time in the carrier sense time setting section 14, set transmission data to the IC tag, and then store data received from the IC tag.

The transmitting section 40 may send the transmission data set by the control section 30 by emitting radio waves, upon receipt of the channel information and the radio emission permission from the time comparing section 15.

The receiving section 50 may receive a response from the IC tag.

The transmitting antenna 3a and the receiving antenna 3b may be used for communicating with the IC tag 4.

The separate antennas, transmitting antenna 3a and the receiving antenna 3b, of FIG. 1 may alternatively be combined into a transmission/reception antenna.

The function of the control terminal 2 may alternatively be incorporated into the function of the control section 30, so that the data reading apparatus is configured without the control terminal 2.

If there is only one channel available, then it is enough to use only one section each: a channel based interference level detecting section 21, a channel based carrier sense lapse time holding section 22, and a channel based interference level holding section 23.

According to this embodiment, the multi channel setting section 11 may set a plurality of frequencies as frequencies to be used for communicating with the IC tag 4 (usage scheduled frequencies). The multi channel setting section 11 is an example of the usage scheduled frequency setting section.

The plurality of channel based interference level detecting sections 21a to 21n may monitor radio interference in the plurality of frequencies (usage scheduled frequencies) set by the multi channel setting section 11 in parallel on a time sharing basis. The plurality of channel based interference level detecting sections 21a to 21n is an example of the interference monitoring section. In FIG. 4, the plurality of channel based interference level detecting sections is deployed. However, it should be noted that a single interference level detecting section can monitor radio interference in a plurality of channels in parallel.

The plurality of channel based interference level holding sections 23a to 23n may hold the respective radio interference levels of the plurality of frequencies (usage scheduled frequencies) detected by the plurality of channel based interference level detecting sections 21a to 21n while monitoring radio interference in the plurality of frequencies. The plurality of channel based interference level holding sections 23a to 23n is an example of an interference level holding section. In FIG. 4, the plurality of channel based interference level holding sections is deployed. However, it should be noted that a single channel based interference level holding section can hold radio interference levels of the plurality of channels.

The time/level comparing section 24 may permit a wireless data communication in a frequency where the carrier sense lapse time (a duration of no interference) exceeds the carrier sense time, which is a threshold corresponding to the carrier sense lapse time, and where the radio interference level is the lowest of all the radio interference levels held by the channel based interference holding sections 23a to 23n. The time/level comparing section 24 is an example of the time comparing section.

First, an operation is described briefly with reference to FIG. 2 and FIG. 4.

The data reading apparatus 1 sets, in the multi channel setting section 11, one or more channels available that have been set in the control section 30 at the startup (Step 1 of FIG. 2).

Next, the control section 30 generates a predetermined period of time (e.g., a random time) as the carrier sense time, and sets the carrier sense time in the carrier sense time setting section 14 (Step 2 of FIG. 2). The control section 30 then clears the carrier sense lapse time currently held by the channel based carrier sense lapse time holding sections 22a to 22n (Step 3 of FIG. 2).

In the data reading apparatus 1, the channel based interference level detecting sections 21a to 21n detect radio interference in corresponding channels set by the multi channel setting section 11, if radio interference is on or below the predetermined threshold, it is determined that carrier sensing is OK, then, corresponding channel based carrier sense lapse time holding sections 22a to 22n measure a period of time during which radio interference is on or below the threshold.

At the same time, radio interference levels detected by the channel based interference level detecting sections 21a to 21n are held by the corresponding channel based interference level holding sections 23a to 23n.

When the channel based interference detecting sections 21a to 21n detect radio interference, and a detected radio interference level is on or above the predetermined threshold, then the channel based interference detecting sections 21a to 21n clear the carrier sense lapse time currently held by corresponding channel based carrier sense lapse time holding sections 22a to 22n.

The radio interference detecting process performed by the data reading apparatus 1 described hereinabove may be implemented in parallel with a communication between the control section 30 and the control terminal 2 described hereinafter.

The control section 30 determines whether a request to stop carrier sensing is received from the control terminal 2 (Step 4 of FIG. 2).

When the stop request is received from the control terminal 2 ("Yes" in Step 4 of FIG. 2), the control section 30 performs a stop process (Step 11 of FIG. 2) and terminates the process.

If the stop request has not been received from the control terminal 2 ("No" in Step 4 of FIG. 2), then the control section 30 determines whether a request to read the IC tag 4 is received from the control terminal 2 (Step 5 of FIG. 2).

When the read request has not been received from the control terminal 2 ("No" in Step 5 of FIG. 2), the control section 30 repeats the process of determining whether the stop request is received from the control terminal 2 (Step 4 of FIG. 2).

When the read request is received from the control terminal 2 ("Yes" in Step 5 of FIG. 2), then the time/level comparing section 24, instructed by the control section 30, determines whether the carrier sense lapse time exceeds a previously set carrier sense time (the carrier sense time set in Step 2 of FIG. 2) in a previously set channel to be used (the channel set in Step 1 of FIG. 2) (Step 6 of FIG. 2).

If the carrier sense lapse time has not exceeded the previously set carrier sense time (Step 2 of FIG. 2) ("No" in Step 6 of FIG. 2), then the time/level comparing section 24 waits until the carrier sense lapse time exceeds the previously set carrier sense time (Step 2 of FIG. 2).

When the carrier sense lapse time has exceeded the previously set carrier sense time (Step 2 of FIG. 2) ("Yes" in Step 6 of FIG. 2), then the time/level comparing section 24 instructs the transmitting section 40 to emit radio waves in a channel where the radio interference level is the lowest of all the radio interference levels held by the cannel based interference level holding sections 23a to 23n. The transmitting section 40 starts emitting radio waves in a channel specified by the time/level comparing section 24. Thus, commands are transmitted from the transmitting section 40 (Step 7 of FIG. 2).

When the command transmission is completed (Step 7 of FIG. 2), the receiving section 50 tries to receive a response from the IC tag 4 (Step 8 of FIG. 2).

When the response reception from the IC tag is completed (Step 8 of FIG. 2), the control section 30 determines whether a read operation from the IC tag 4 is completed (Step 9 of FIG. 2). When the read operation is completed ("Yes" in Step 9 of FIG. 2), the control section 30 reports a read result to the control terminal 2 (Step 10 of FIG. 2). Then, the control section 30 sets one or more channels available in the multi channel setting section 11 (Step 1 of FIG. 2) for the next communication, and repeats the process described above.

If the read operation is not completed ("No" in Step 9 of FIG. 2), then the transmitting section 40 transmits the command again (Step 7 of FIG. 2) and the receiving section 50 receives the response again (Step 8 of FIG. 2).

In the description above, channels are set every time for use (Step 1 of FIG. 2). In the case where a channel set at the time of startup is continued to be used, the operation may be proceed to the process of setting the carrier sense time (Step 2 of FIG. 2) after reporting the read result to the control terminal 2 (Step 10 of FIG. 2).

Also in the case where the carrier sense time set at the startup is continued to be used, then the process of setting the carrier sense time (Step 2 of FIG. 2) may be skipped over to the next process of clearing the carrier sense lapse time (Step 3 of FIG. 2).

An operation of determining the carrier sense time is now described in detail with reference to FIG. 5.

First, the control section 30 sets available channels in the multi channel setting section 11.

In the example of this figure, CH1, CH2 and CH3 are set as available channels. The frequencies of CH1, CH2 and CH3 differ from one another.

Then, the carrier sense time is set, and the carrier sense lapse time is cleared (not shown in the figure).

Next, when the carrier sense lapse time is cleared, the plurality of channel based interference level detecting sections 21a to 21n detect the radio interference levels of corresponding channels in parallel.

In CH1, no radio interference has been detected for a while since the start of radio interference level detection with the radio interference level on or below the predetermined threshold. Then, after a while, radio interference from other data reader is detected. Then, the carrier sense lapse time is cleared for CH1 (not shown in the figure).

In CH2, the radio interference level is 10, which is on or below the threshold.

In CH3, the radio interference level is 5, which is on or below the threshold.

Then, the control section 30, upon receipt of the read request, instructs the time/level comparing section 24 to compare between the carrier sense lapse time and the carrier sense time, and also between radio interference levels.

Both in CH2 and CH3, the carrier sense lapse time exceeds the carrier sense time, and the radio interference level is on or below the predetermined threshold. The radio interference level is lower in CH3 than CH2. Therefore, the time/level comparing section 24 issues a radio emission permission to permit the transmitting section 40 to use CH3 for communication.

When the transmitting section 40 starts transmission, the channel based interference level detecting sections 21a to 21n stop detecting radio interference levels.

when the transmitting section 40 completes the command transmitting operation and the receiving section 50 completes the response receiving operation, the communication is completed. The transmitting section 40 then stops emitting radio waves.

When the communication is completed, the control section 30 reports a result to the control terminal 2.

After reporting the result to the control terminal 2, the control section 30 sets available channels and the carrier sense time again for the next communication.

In the example of this figure, CH2 and CH3 are set as available channels. After the carrier sense lapse time is cleared, the channel based interference level detecting sections 21a to 21n detect radio interference in parallel in CH2 and CH3.

As described above, radio interference levels may be detected in previously set one or more available channels in parallel. This may allow for a reduction in response time to the read request from the control terminal.

A channel where the radio interference level is the lowest may be selected. This may enable the communication to be performed in an environment less influenced by radio interference. Hence, a high quality of communication may be maintained.

In the above description, radio interference levels are detected in the plurality of channels in parallel prior to receipt of a read request. Alternatively, however, it is also possible to start detecting radio interference levels in a plurality of channels after receipt of a read request.

Thus, the data reading apparatus described in this embodiment may be configured to include the time shared frequency based interference detecting means detecting interference of an individual frequency on a time sharing basis as the frequency based interference detecting means.

The data reading apparatus thus performing contactless data communications with IC tags is explained in this embodiment, and the data reading apparatus may also be configured to include:
(a) a multi frequency setting means setting a plurality of available frequencies in advance;
(b) a frequency based interference level detecting means detecting radio interference from other data reader in a frequency set by the multi frequency setting means, and reporting an interference level;
(c) a carrier sense time setting means setting time for carrier sensing;
(d) a frequency based carrier sense lapse time holding means holding a period of no interference detected based on an interference detection result from the frequency based interference detector;
(e) a frequency based interference level holding means holding frequency based interference levels detected by the frequency based interference level detecting means; and
(f) a time/level comparing means permitting transmission in a frequency where the interference level held by the frequency based interference level holding means is the lowest, when the frequency based carrier sense lapse time held by the frequency based carrier sense lapse time holding means is on or above the carrier sense time held by the carrier sense time setting means.

The data reading apparatus may transmit in a frequency where the interference level held by the frequency based interference level holding means is the lowest, when the frequency based carrier sense lapse time held by the frequency based carrier sense lapse time holding means is on or above the carrier sense time held by the carrier sense time setting means.

Figure 1:
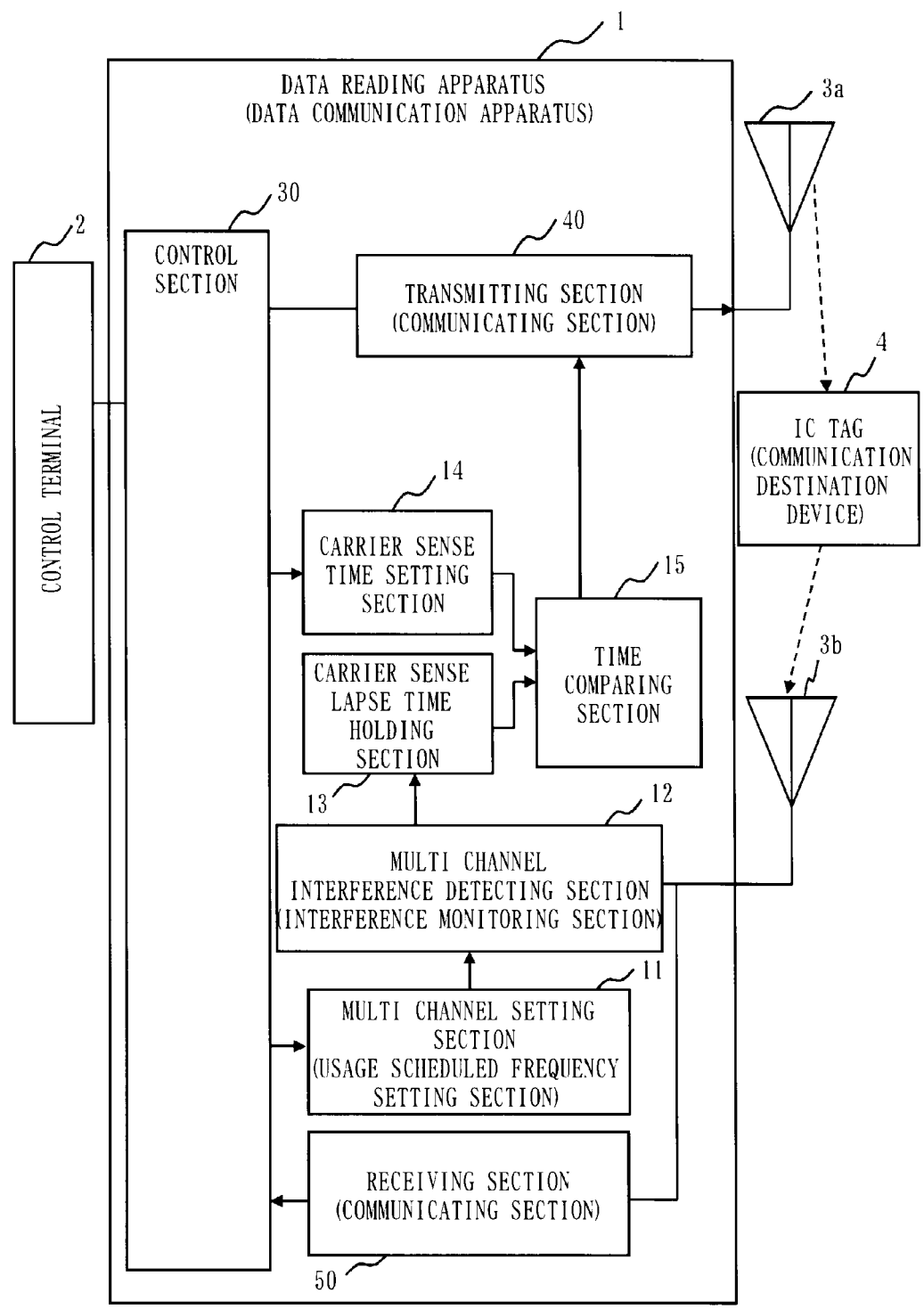
FIG. 1 illustrates an example configuration of a data reading apparatus according to a first embodiment.
Figure 2:
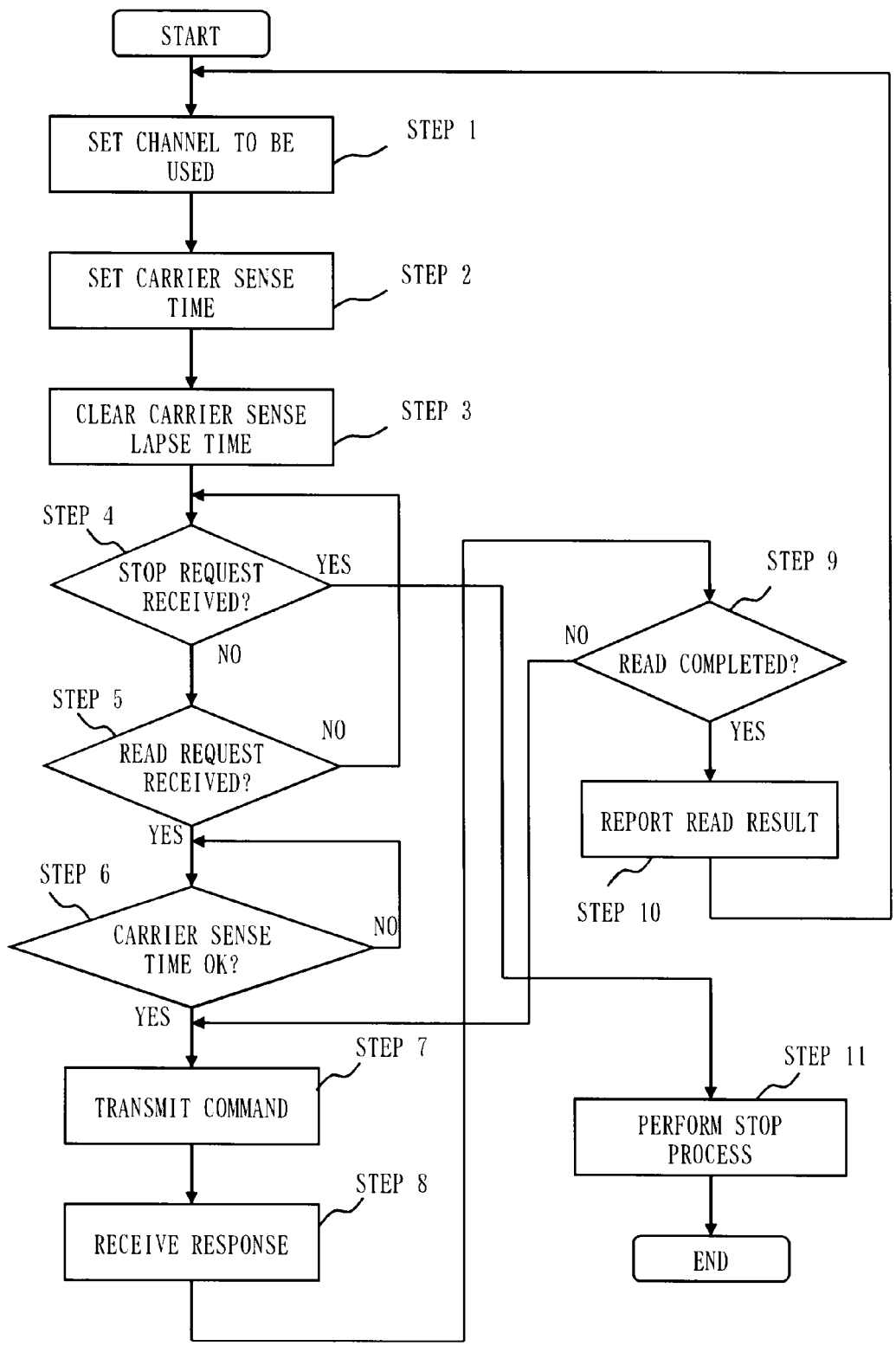
FIG. 2 illustrates a flow chart showing an example operation of the data reading apparatus according to the first embodiment and a data reading apparatus according to a second embodiment.
Figure 3:
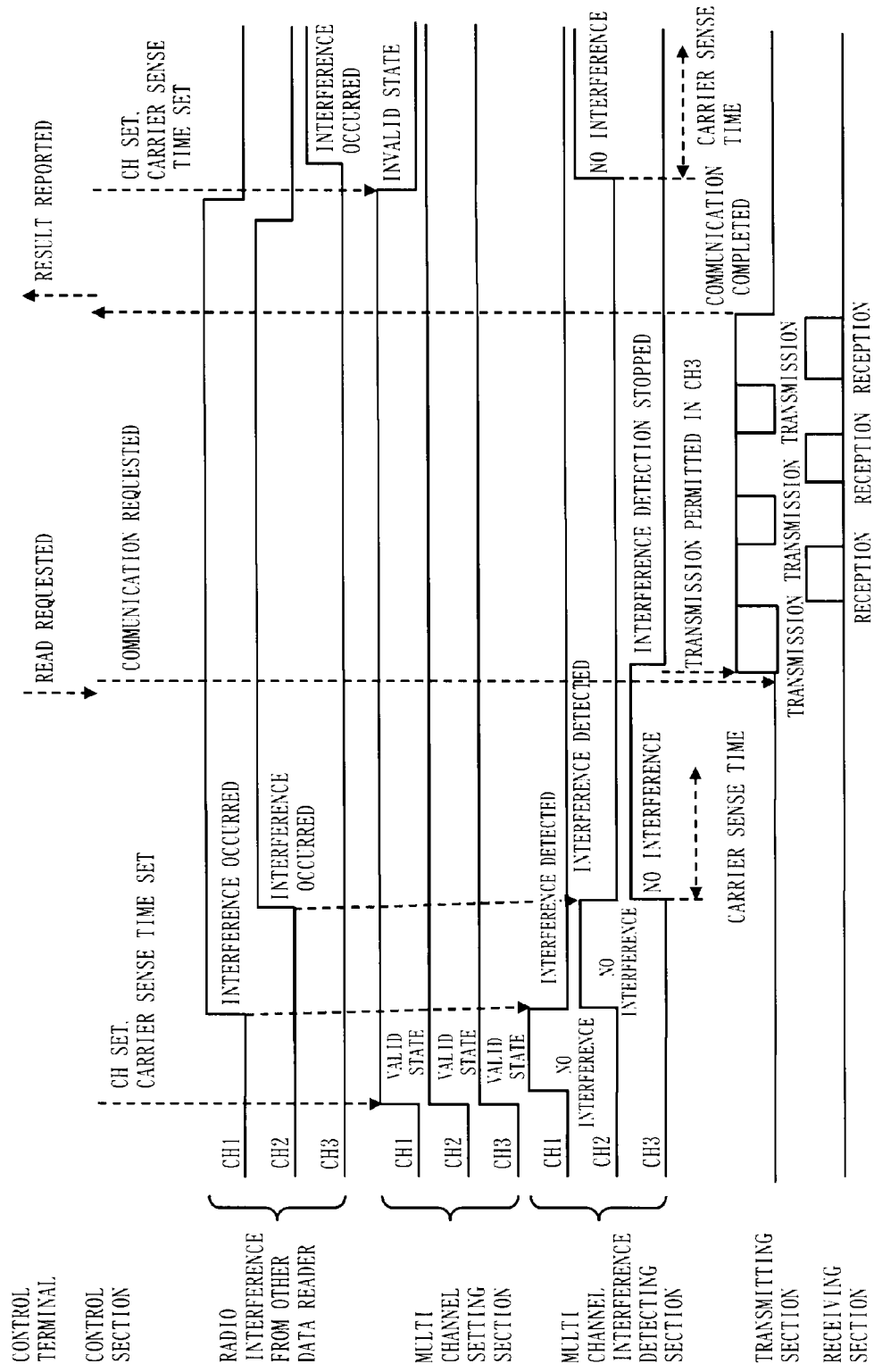
FIG. 3 illustrates a timing chart showing an example operation of the data reading apparatus according to the first embodiment.
Figure 4:
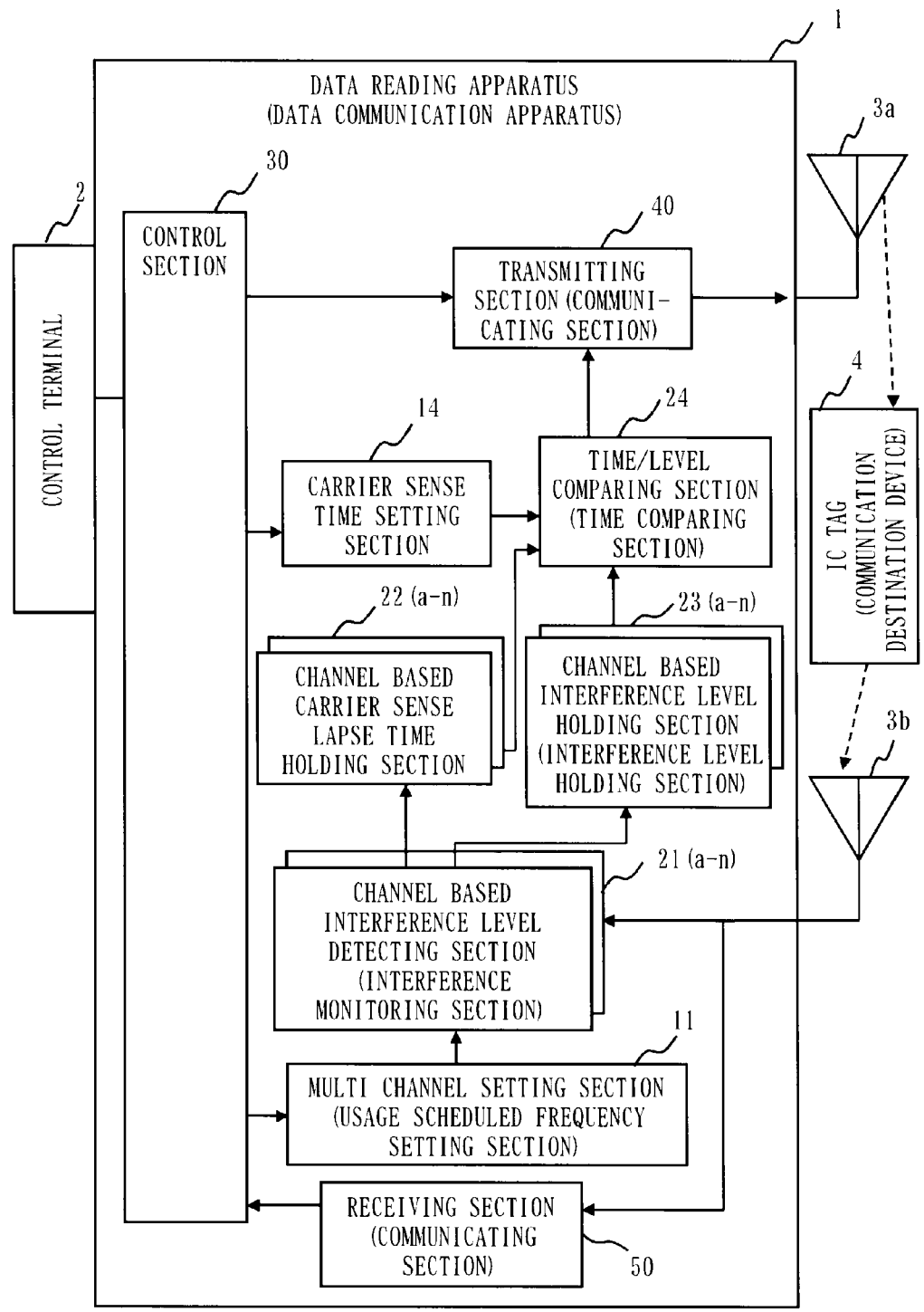
FIG. 4 illustrates an example configuration of the data reading apparatus according to the second embodiment.
Figure 5:
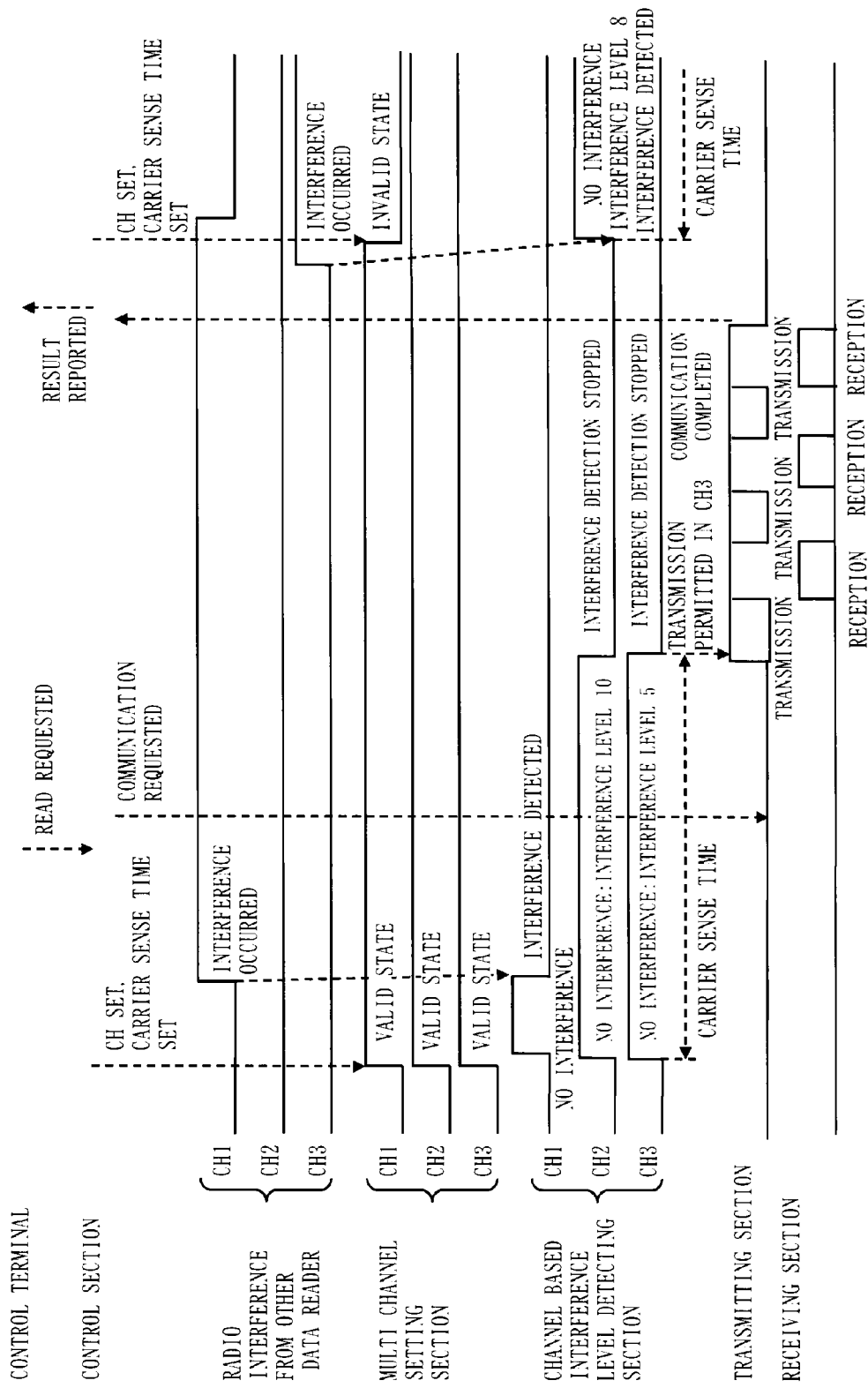
FIG. 5 illustrates a timing chart showing an example operation of the data reading apparatus according to the second embodiment.
Figure 6:
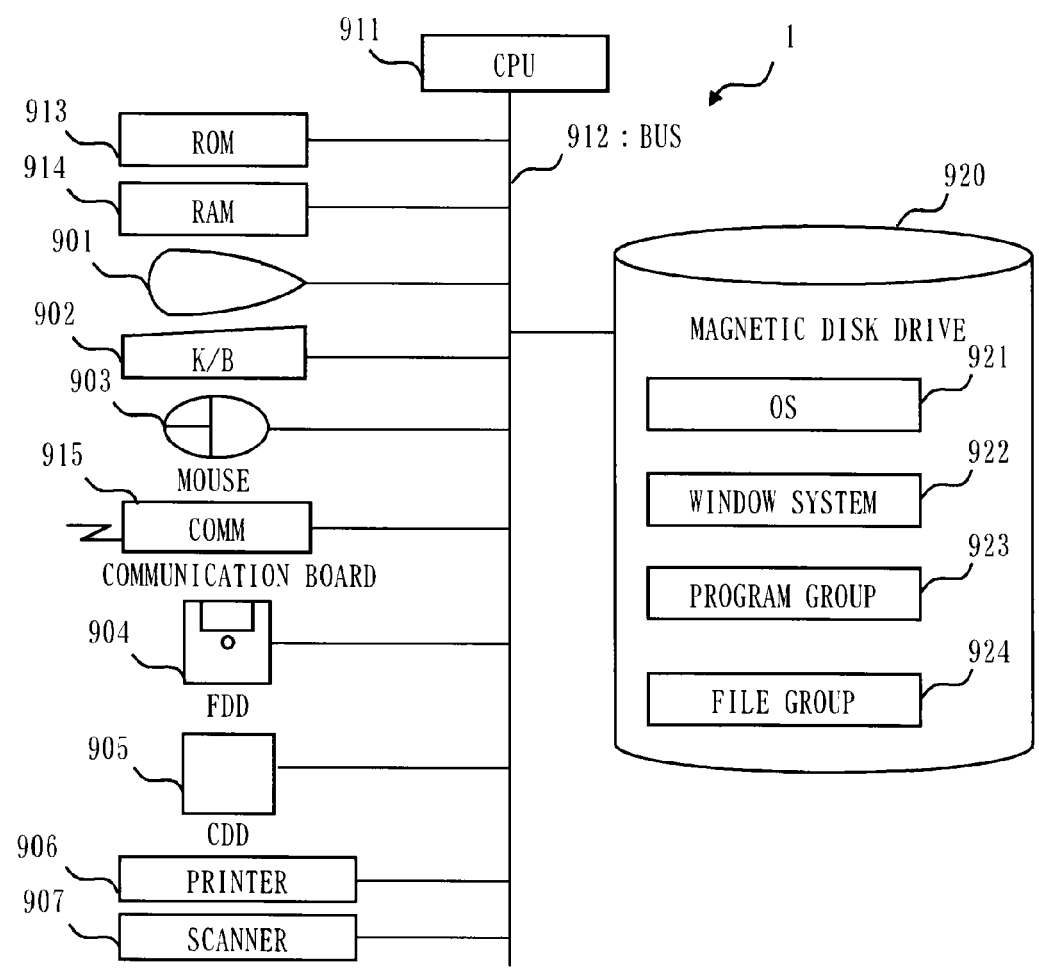
FIG. 6 illustrates an example hardware configuration applicable to the data reading apparatuses according to the first and second embodiments.

EXPLANATION OF REFERENCE NUMERALS 1 data reading apparatus
2 control terminal
3a transmitting antenna
3b receiving antenna
4 IC tag
11 multi channel setting section
12 multi channel interference detecting section
13 carrier sense lapse time holding section
14 carrier sense time setting section
15 time comparing section
21 channel based interference level detecting section
22 channel based carrier sense lapse time holding section
23 channel based interference level holding section
24 time/level comparing section
30 control section
40 transmitting section
50 receiving section

The invention claimed is:

1. A data communication apparatus performing a wireless data communication with a communication destination device, comprising:
   an interference monitoring section that, upon expiration of a carrier sense interval and prior to receipt of a request to start wireless data communication with a communication destination device, sequentially monitors radio interference in each of a plurality of usage scheduled frequencies to be used for the wireless data communication with the communication destination device;
   a time comparing section that, upon receipt of the request to start the wireless data communication with the communication destination device, compares a duration of no interference, during which the interference monitoring section detects no radio interference in a monitored one of the usage scheduled frequencies, with a threshold corresponding to the duration of no interference, and permits the wireless data communication in the monitored one of the usage scheduled frequencies when the duration of no interference exceeds the threshold, the time comparing section not permitting data wireless data communication in the monitored one of the usage scheduled frequencies and resetting the carrier sense interval when radio interference is detected in the monitored one of the usage scheduled frequencies; and
   a communicating section that performs the wireless data communication with the communication destination device in one of the usage scheduled frequencies based on a permission issued by the time comparing section.

2. The data communication apparatus according to claim 1, wherein the time comparing section permits the wireless data communication in one of the usage scheduled frequencies corresponding to a duration of no interference that is less than the threshold at a time of receipt of the request to start the wireless data communication with the communication destination device, when the duration of no interference exceeds the threshold, as a result of no radio interference detected in the one of the usage scheduled frequencies by the interference monitoring section even after receipt of the request to start the wireless data communication with the communication destination device.

3. The data communication apparatus according to claim 1 further comprising:
   a usage scheduled frequency setting section that sets a plurality of frequencies as the plurality of usage scheduled frequencies, and also sets an order of monitoring radio interference by the interference monitoring section in the plurality of usage scheduled frequencies;
   wherein the interference monitoring section monitors radio interference in one of the plurality of usage scheduled frequencies according to the order of monitoring set by the usage scheduled frequency setting section, and monitors radio interference in a next usage scheduled frequency in the order of monitoring when radio interference is detected in the one of the plurality of usage scheduled frequencies being monitored.

4. The data communication apparatus according to claim 1, wherein the data communication apparatus is a data reading apparatus that is configured to communicate with a contactless IC tag as the communication destination device.

5. A communication method, where a data communication apparatus performs a wireless data communication with a communication destination device, comprising:
   upon expiration of a carrier sense interval and prior to receipt of a request to start wireless data communication with a communication destination device, sequentially monitoring, by the data communication apparatus, radio interference in a plurality of usage scheduled frequencies to be used for the wireless data communication with the communication destination device;
   comparing, by the data communication apparatus and upon receipt of the request to start the wireless data communication with the communication destination device, a duration of no interference, during which no radio interference is detected in a monitored one of the usage scheduled frequencies, with a threshold corresponding to the duration of no interference; and
   performing, by the data communication apparatus, the wireless data communication with the communication destination device in one of the usage scheduled frequencies in which no radio interference is detected for a duration of no interference that exceeds the threshold.

6. A non-transitory computer readable storage medium including computer executable instructions stored therein, the computer executable instructions causing a computer performing a wireless data communication with a communication destination device to execute:
   an interference monitoring process, for, upon expiration of a carrier sense interval and prior to receipt of a request to start wireless data communication with a communication destination device, sequentially monitoring radio interference in a plurality of usage scheduled frequencies to be used for the wireless data communication with the communication destination device;
   a time comparing process, for, upon receipt of the request to start the wireless data communication with the communication destination device, comparing a duration of no interference, during which no radio interference is detected in a monitored one of the usage scheduled frequencies in the interference monitoring process, with a threshold corresponding to the duration of no interference, and for permitting the wireless data communication in the monitored one of the usage scheduled frequencies, when the duration of no interference exceeds the threshold; and a communicating process, for performing the wireless data communication with the communication destination device in one of the usage scheduled frequencies based on a permission issued in the time comparing process.

* * * * *